A. D. SEIBERT & B. R. ANDRUS.
SPRING WHEEL.
APPLICATION FILED APR. 14, 1913.

1,077,434.

Patented Nov. 4, 1913.

2 SHEETS—SHEET 1.

Witnesses
L. B. James
C. E. Hunt

Inventors
Arthur D. Seibert
Burton R. Andrus
By H. B. Willson & Co.
Attorneys

A. D. SEIBERT & B. R. ANDRUS.
SPRING WHEEL.
APPLICATION FILED APR. 14, 1913.

1,077,434.

Patented Nov. 4, 1913.

2 SHEETS—SHEET 2.

Witnesses
L. B. James
C. E. Hunt

Inventors
Arthur D. Seibert &
Burton R. Andrus

By H. B. Willson & Co.
Attorneys

COLUMBIA PLANOGRAPH CO., WASHINGTON, D. C.

UNITED STATES PATENT OFFICE.

ARTHUR D. SEIBERT AND BURTON R. ANDRUS, OF PENDLETON, OREGON.

SPRING-WHEEL.

1,077,434.  Specification of Letters Patent.  Patented Nov. 4, 1913.

Application filed April 14, 1913. Serial No. 761,019.

*To all whom it may concern:*

Be it known that we, ARTHUR D. SEIBERT and BURTON R. ANDRUS, citizens of the United States, residing at Pendleton, in the county of Umatilla and State of Oregon, have invented certain new and useful Improvements in Spring-Wheels; and we do declare the following to be a full, clear, and exact description of the invention, such as will enable others skilled in the art to which it appertains to make and use the same.

This invention relates to improvements in spring wheels for vehicles.

One object of the invention is to provide a spring wheel having an improved construction and arrangement of hub and spokes and means whereby the hub is yieldingly secured to the inner ends of the spokes and forms a resilient support for the vehicle to which the wheel is applied.

Another object is to provide a vehicle wheel of this character having resilient driving connections between the rim and hub of the wheel which will relieve the spokes of strain resulting from the pull of the rim thereon.

A further object is to provide a spring wheel for vehicles which will possess all the advantages of a pneumatic tired wheel without having the disadvantages of this form of wheel.

With these and other objects in view, the invention consists of certain novel features of construction, and the combination and arrangement of parts as will be more fully described and claimed.

Figure 1:
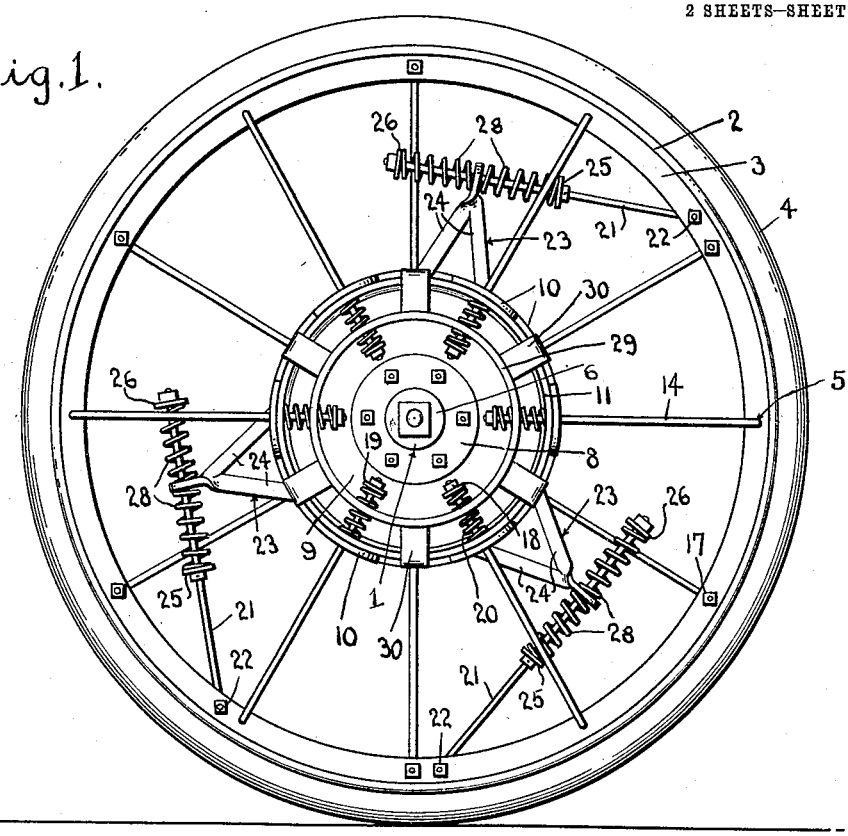
Figure 7:
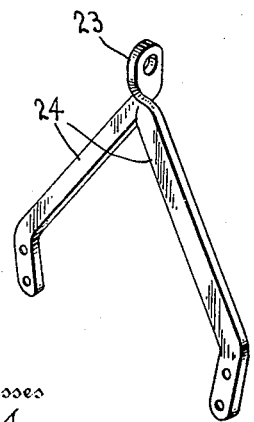
Figure 4:
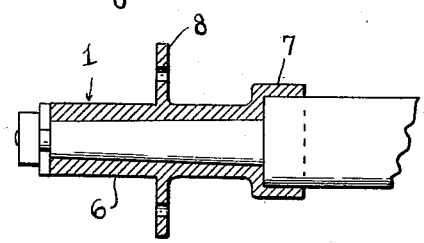
Figure 2:
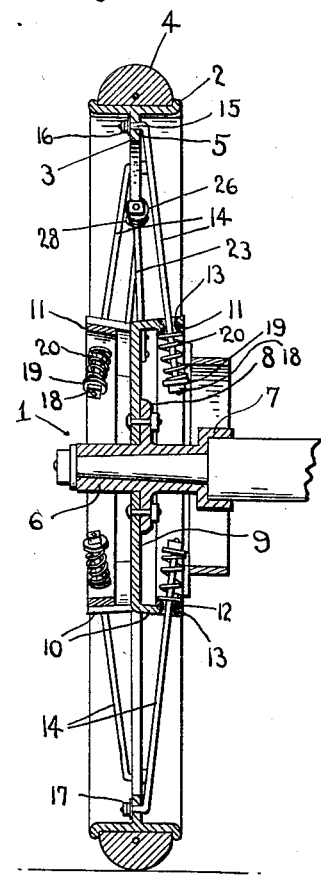
Figure 5:
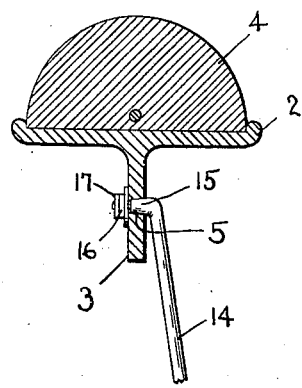
Figure 3:
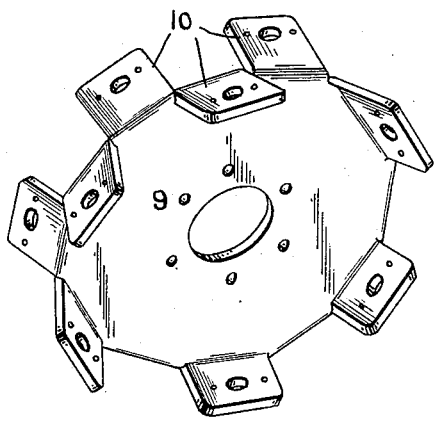
Figure 6:
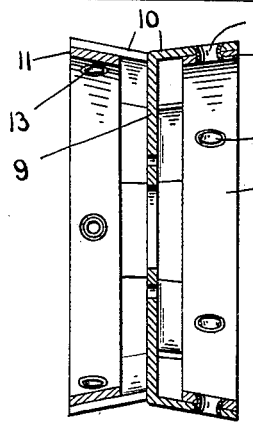

In the accompanying drawings: Figure 1 is a side view of our improved wheel; Fig. 2 is a central vertical section thereof; Fig. 3 is a detail perspective view of the spoke receiving member of the hub; Fig. 4 is a central longitudinal sectional view of the inner member or box of the hub; Fig. 5 is an enlarged detail cross section through the rim at the point where one of the spokes is secured thereto, showing the construction of the rim engaging end of the spoke; Fig. 6 is a central vertical sectional view through the spoke receiving member and bracing bands of the hub. Fig. 7 is a detail perspective view of one of the levers of the driving connections.

Our improved spring wheel comprises a hub 1, a rim 2 having a tire receiving portion and an annular flange 3 which extends inwardly or radially from the center of the tire receiving portion of the rim as shown. Any suitable form of tire may be applied to the rim, the same being here shown as a solid rubber cushion tire 4. In the flange 3 of the rim are formed transverse spoke holes 5, said holes being preferably tapered as shown.

The hub 1 comprises a central axis receiving member or box 6 which is preferably cylindrical on its outer surface and has therethrough a central bore to receive the spindle of the axle and on the inner ends of which is preferably formed an annular dust cap or sand band 7 which is designed to fit over the outer end of the axle to prevent the entrance of dust or dirt between the axle spindle and bore of the box. On the box 6 midway between its ends is formed an annular radially projecting flange 8 to which is bolted the inner edge of a spoke receiving plate 9 which, when bolted or otherwise secured to the flange 8 projects radially from the box to a suitable distance and has formed on its outer edge series of spoke receiving lugs 10 each successive one of which projects in opposite directions and at right angles to the plate as clearly shown in Fig. 3 of the drawings. Riveted to the inner sides of the lugs 10 on opposite sides of the plate 9 are bracing bands 11 and through each of said lugs and the adjacent portion of the bands is formed a spoke hole 12. In each of the holes 12 is arranged a short sleeve or thimble 13 the ends of which are upset against the outer side of the lugs and against the inner side of the bands 11, said thimbles forming a smooth passage for the spokes which will relieve the friction which might occur between the edges of the holes and the spokes passing therethrough. The passages of the sleeves or thimbles 13 are considerably greater than the diameter of the spokes, thus allowing the latter to have sufficient play in the thimbles to permit the necessary movement of the hub which is yieldingly attached to the inner ends of the spokes as will be hereinafter described.

The spokes 14 are arranged between the hub and rim of the wheel in the usual manner and the outer ends of the spokes have formed thereon right angularly projecting tapered studs 15 which are adapted to be engaged with the tapered spoke holes 5 in the flange 3 of the wheel, said studs 15 having cylindrical threaded outer ends with which are adapted to be engaged clamping nuts 16 and jam nuts 17 whereby the tapered studs are drawn through and securely fastened in the bolt holes 5. The tapered construction of the studs 15 and spoke holes 5 permits any wear on these parts to be taken up by the nuts 16, thus preventing any lost motion or rattling of the spokes in the rim. The studs 15 of the successive spokes are inserted through the rim in opposite direction while the inner ends of the spokes on one side of the rim are engaged with the thimbles 13 in the lugs 10 and bands 11 of the corresponding side of the wheel as clearly shown in Fig. 2 of the drawing. The inner ends of the spokes 14 project a suitable distance through the thimbles 13 and have their extremities threaded to receive a nut 18 and washer 19. On the inner ends of the spokes 14 between the washers 19 and the inner ends of the thimbles or inner surfaces of the bands 11 are arranged coiled springs 20 which yieldingly secure the hub to the spokes and form a resilient support for the ends of the axles and for the vehicle to which they are attached.

Arranged between the hub and rim of the wheel and spaced suitable distances apart are resilient driving connections each of which comprises a driving rod 21, one end of which is bent at right angles and engaged with an aperture in the rim of the wheel, said end of the rod being threaded to receive a nut 22 whereby said end is secured to the rim. The rods 21 project inwardly and tangentially to the hub and are disposed substantially midway between the hub and the rim of the wheel as shown. The rods 21 have their inner ends slidably engaged with the outer ends of driving levers 23 which are preferably in the form of arms or bars 24 which diverge from their outer toward their inner ends and have their inner ends riveted or otherwise securely fastened to the spoke receiving plate 9 of the hub as shown. The levers 23 are preferably formed from heavy sheet metal strips or bars cut to form the arms 24 and which have their outer ends twisted or turned at right angles to the flat sides of the arms, said outer ends having apertures to receive the driving rods 21 which are slidably engaged therewith and project through the same to a suitable distance as shown. Secured to the driving rods between the ends of the levers 23 and the rim engaging ends of the driving rods are stop washers 25, while the free ends of the driving rods are threaded and have thereon stop washers 26 and nuts 27. On the driving rods between the outer ends of the levers 23 and the stop washers 25 and 26 are arranged coiled springs 28 which serve to yieldingly resist the pull and push of the rim of the wheel and thus form yielding driving connections between the hub and wheel rim as will be readily understood. These resilient driving connections between the wheel and hub effectually relieve the spokes of all strain resulting from the pull of the rim and leave the spokes free to yieldingly support the hub through the springs applied to the inner ends of the spokes as hereinbefore described. Any desired number of resilient driving connections may be provided, three of the same being shown in the present instance.

If desired, the wheel may be provided with friction bands 29 which may be applied to one or both sides of the hub and in the present instance only one friction band is shown. The band 29 is of less diameter than the bracing bands 11 to one of which said friction band is secured by a series of radially disposed connecting plates 30, the oppositely projecting right angular ends of which are respectively secured to the outer side of the bracing band and to the inner side of the friction band as shown. The friction band 29 may be provided to receive a brake band or for any other purpose.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described our invention, what we claim is:

1. In a spring wheel, a rim, a hub comprising a box, a spoke receiving plate secured to said box, series of oppositely projecting spoke receiving lugs formed on said plate, bracing bands secured to said lugs, said bands and lugs having therein spoke receiving apertures, a series of radially arranged spokes secured at their outer ends to said rim and having a loose sliding engagement at their inner ends with the apertures in said lugs and bands, stops arranged on the inner ends of said spokes, and coiled springs arranged between said stops and the inner side of said bracing bands.

2. In a spring wheel, a rim, a hub comprising a box, a spoke receiving plate secured thereto and having on its outer edge a series of oppositely projecting spoke receiving lugs, bracing bands secured to said lugs, said bands and lugs having therein spoke receiving apertures, thimbles secured in said apertures, a series of spokes having a loose sliding engagement at their inner ends with said thimbles, right angularly projecting tapered studs formed on the outer ends of said spokes and having threaded ends, said tapered studs being inserted through said rim, clamping nuts engaged with the threaded ends of said studs, stops arranged on the inner ends of said spokes and springs arranged on said inner ends of the spokes between said stops and said bracing bands.

3. In a spring wheel, a rim, a hub comprising a box, a spoke receiving plate secured to said box, spoke receiving lugs formed on the outer edge of said plate and projecting at right angles and in opposite directions, bracing bands secured to said lugs, said bands and lugs having therein spoke receiving apertures, spokes secured at their outer ends in said rim and having their inner ends loosely and yieldingly secured in said apertured lugs and bracing bands, and resilient driving connections between said hub and the rim of the wheel.

4. In a spring wheel, a rim, a hub comprising a box, a spoke receiving plate secured to said box, spoke receiving lugs formed on the outer edge of said plate and projecting at right angles and in opposite directions, bracing bands secured to said lugs, said bands and lugs having therein spoke receiving apertures, spokes secured at their outer ends in said rim and having their inner ends loosely and yieldingly secured in said apertured lugs and bracing bands, resilient driving connections arranged between the hub and rim of the wheel and comprising levers secured to and projecting radially from the spoke receiving plate of the hub, said levers having apertured outer ends, driving rods secured at their outer ends to the rim of the wheel and having a sliding engagement with the apertured outer ends of said levers, stops arranged on said driving rods on opposite sides of said levers, and coiled springs arranged between the opposite sides of the levers and said stops.

5. In a spring wheel, a rim, a hub comprising a box, a spoke receiving plate secured to said box, spoke receiving lugs formed on the outer edge of said plate and projecting at right angles and in opposite directions, bracing bands secured to said lugs, said bands and lugs having therein spoke receiving apertures, spokes secured at their outer ends in said rim and having their ends loosely and yieldingly secured in said apertured lugs and bracing bands, and a friction band secured to one of said bracing bands.

6. In a spring wheel, a rim having an inwardly extending radial flange provided with series of transverse tapered apertures, a box, a spike receiving plate secured to said box, series of spokes secured at their outer ends in the apertures of said rim and having a yielding connection at their inner ends with said plate, resilient driving connections arranged between said hub and rim of the wheel and comprising levers consisting of arms diverging from their outer ends and having their spaced inner ends rigidly secured to the spoke receiving plate of the hub and having in their connected outer ends transverse passages, driving rods secured at their outer ends in the flange of the wheel rim and having a sliding engagement at their inner ends with said apertured outer ends of the levers, stops arranged on said driving rods on opposite sides of and spaced from the outer ends of the levers, and coiled springs arranged between the opposite sides of the levers and said stops.

In testimony whereof we have hereunto set our hands in presence of two subscribing witnesses.

ARTHUR D. SEIBERT.
BURTON R. ANDRUS.

Witnesses as to signature of Arthur D. Seibert:
W. D. CHAMBERLAIN,
LEE MOORHOUSE.

Witnesses as to signature of Burton R. Andrus:
MACY BAKER,
W. R. CALDWELL.

---

Copies of this patent may be obtained for five cents each, by addressing the "Commissioner of Patents, Washington, D. C."